US006994354B2

(12) United States Patent
Sakata (10) Patent No.: US 6,994,354 B2
(45) Date of Patent: Feb. 7, 2006

(54) VIBRATIONALLY DECOUPLING GASKET

(75) Inventor: David Sakata, Livonia, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 10/342,979

(22) Filed: Jan. 15, 2003

(65) Prior Publication Data

US 2003/0160397 A1 Aug. 28, 2003

Related U.S. Application Data (60) Provisional application No. 60/349,024, filed on Jan. 15, 2002.

(51) Int. Cl.
*F02F 11/00* (2006.01)

(52) U.S. Cl. ............ 277/598; 277/634; 277/637; 277/916; 123/195 C; 285/226

(58) Field of Classification Search ........... 277/591, 277/634, 636, 637, 641, 593, 598, 916; 123/195 C; 285/226–229

See application file for complete search history.

(56) References Cited

U.S. PATENT DOCUMENTS

| | | | | |
|---|---|---|---|---|
| 2,875,917 A | * | 3/1959 | Alkire | 220/378 |
| 2,998,986 A | * | 9/1961 | Buono | 285/229 |
| 3,159,524 A | * | 12/1964 | Cantabene et al. | 428/107 |
| 3,195,360 A | * | 7/1965 | Burnett | 74/18.2 |
| 3,396,712 A | * | 8/1968 | Sakraida et al. | 123/198 E |
| 3,427,776 A | * | 2/1969 | Lake et al. | 52/204.591 |
| 3,976,312 A | * | 8/1976 | Murphree | 285/45 |
| 4,067,531 A | * | 1/1978 | Sikula | 220/378 |
| 4,121,845 A | * | 10/1978 | Reynolds et al. | 277/634 |
| 4,241,944 A | * | 12/1980 | Clark | 285/229 |
| 4,447,172 A | * | 5/1984 | Galbreath | 404/68 |
| 4,448,430 A | * | 5/1984 | Bright | 277/642 |
| 4,449,742 A | * | 5/1984 | Toerner et al. | 285/236 |
| 4,499,869 A | * | 2/1985 | Visek | 123/195 C |
| 4,667,628 A | * | 5/1987 | Lopez-Crevillen | 123/195 C |
| 4,726,609 A | * | 2/1988 | Daignot et al. | 285/4 |
| 4,958,860 A | * | 9/1990 | Akitsu | 285/49 |
| 5,213,346 A | * | 5/1993 | Thomson et al. | 277/315 |
| 5,228,420 A | * | 7/1993 | Furuya et al. | 123/90.38 |
| 5,255,647 A | * | 10/1993 | Kiczek | 123/195 C |
| 5,267,739 A | * | 12/1993 | Vaughan | 277/642 |
| 5,329,893 A | * | 7/1994 | Drangel et al. | 123/78 C |
| 5,458,344 A | * | 10/1995 | Weiler et al. | 277/634 |
| 5,516,123 A | * | 5/1996 | Eckel | 277/637 |
| 5,558,580 A | * | 9/1996 | Okuyama | 464/175 |
| 5,667,224 A | * | 9/1997 | Streckert et al. | 277/634 |
| 5,716,158 A | * | 2/1998 | Hahn et al. | 403/291 |
| 5,899,463 A | * | 5/1999 | Koch | 277/634 |
| 5,957,100 A | * | 9/1999 | Frohwerk et al. | 123/90.38 |

(Continued)

OTHER PUBLICATIONS

Spring-Fast Composite Grommet Edging, Device Technologies Catalog, 2000.

(Continued)

*Primary Examiner*—Alison K. Pickard
(74) *Attorney, Agent, or Firm*—Ronald W. Wangerow; Harness, Dickey & Pierce, P.L.C.

(57) ABSTRACT

A gasket includes a fist sealing portion, a second sealing portion, and an elastic arm sealingly connecting between the two. The first sealing portion sealingly engages a first member and the second sealing portion sealingly engages a second member. The elastic arm is not highly compressed between the members, allowing the gasket to vibrationally decouple the first member from the second member.

8 Claims, 6 Drawing Sheets

U.S. PATENT DOCUMENTS 6,161,840 A * 12/2000 Boardman et al. .......... 277/596
6,234,044 B1 * 5/2001 Slon et al. .................... 74/566
6,308,959 B1 * 10/2001 Sokolihs et al. ............ 277/394

OTHER PUBLICATIONS

Ultra-Grip Clean Seal Inc. Catalog.

* cited by examiner

VIBRATIONALLY DECOUPLING GASKET

CROSS REFERENCE TO RELATED APPLICATIONS

This clams the benefit of U.S. provisional patent application identified as Application No. 60/349,024, filed Jan. 15, 2002.

BACKGROUND OF INVENTION

This invention relates in general to fluid seals. More specifically, this invention relates to gaskets that connect two sealing portions, which prevent fluid leakage between the two, while reducing the transmission of vibrations through the gasket.

In general, conventional gaskets require a relatively high compressive load between the members being sealed in order for the gasket to provide an effective seal. For example, a gasket placed between two stationary members, such as an engine block and an oil pan, or an engine cylinder head and a valve/cam cover, is compressed between these elements. However, while producing an effective seal, these highly compressed gaskets can become a medium for transmitting vibrations, creating poor noise, vibration and harshness (NVH) isolation characteristics between the two members. That is, the vibration load input from one member is easily transferred through the gasket to the other member. Moreover, in these applications that require the high compressive sealing load, the number and placement of fasteners must compensate for deflections caused by the high loading conditions in order to assure a good seal all of the way around the gasket.

Examples of such conventional gaskets requiring a high sealing load between the members include an elastomeric gasket, shaped as an O-ring or similar shape, as well as an edge bond gasket, a carrier gasket, and a rubber coated metal (RCM) gasket. All of these conventional gaskets require a high compressive sealing load to assure an effective seal between the members, so the effectiveness of vibrational isolation of one member from the other is poor. Another example of a conventional gasket is one formed from a room temperature vulcanite (RTV) located between the two members. The RTV is applied as a liquid in a thin layer and cures when exposed to air. For effective sealing with the RTV, however, it requires a hard mount between the members, which also provides poor vibration isolation.

In many applications, including automotive applications, it is desirable to reduce the transmission of vibrations. A reduction of the transmission of vibrations can result in a reduction in noise and harshness, so it is desirable to reduce the transmission of vibrations between two sealed elements, such as an engine block and an oil pan—or engine head and rocker/cam cover.

Thus, it is desirable to have a gasket that will properly seal between two members while allowing for vibration isolation between the two members.

SUMMARY OF INVENTION

In its embodiments, the present invention contemplates a gasket adapted for sealing between a first member and a second member. The gasket includes a first sealing portion adapted to be in sealing engagement with the first member, and a second sealing portion adapted to be in sealing engagement with the second member, and spaced from the first sealing portion. The gasket also includes an elastic arm sealingly connecting the first sealing portion to the second sealing portion, with the elastic arm being in a less than fully compressed state and a less than fully expanded state between the first sealing portion and the second sealing portion, whereby the gasket is adapted to allow the first member to be generally vibrationally decoupled from the second member.

An advantage of the present invention is that effective sealing is achieved between two members while providing for vibrational isolation between the two members.

Another advantage of the present invention is that a surface of each member can be sealed independently of the surface on the other member, with a membrane sealingly connected between the sealing surface of each member. This allows for effective sealing without requiring high compressive loading between surfaces of the members. By avoiding the high compressive loading, the gasket provides for good vibrational isolation between the members.

A further advantage of the present invention is that the number of fasteners can be reduced since balancing of the gasket compressive sealing load is significantly reduced. For example, the number of fasteners used to fasten an oil pan to an engine block can be reduced.

DETAILED DESCRIPTION

Figure 1:
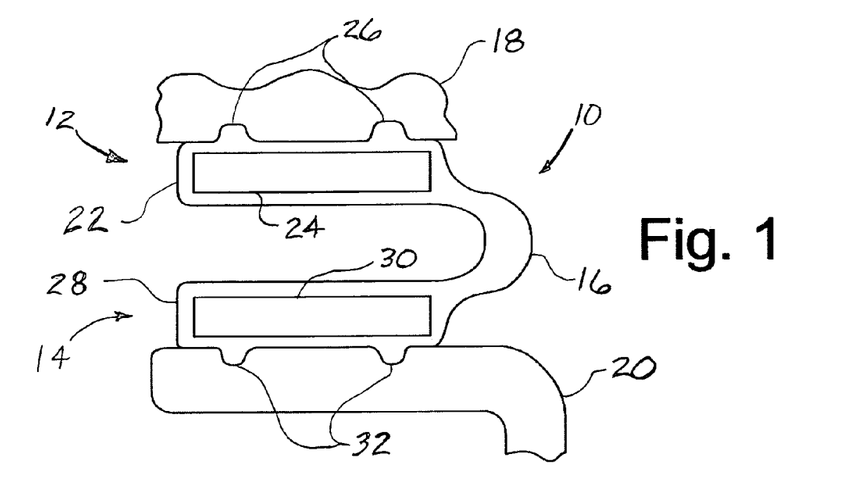
FIG. 1 is a partial, sectional view of a gasket mounted between two members in accordance with a first embodiment of the present invention.
Figure 2:
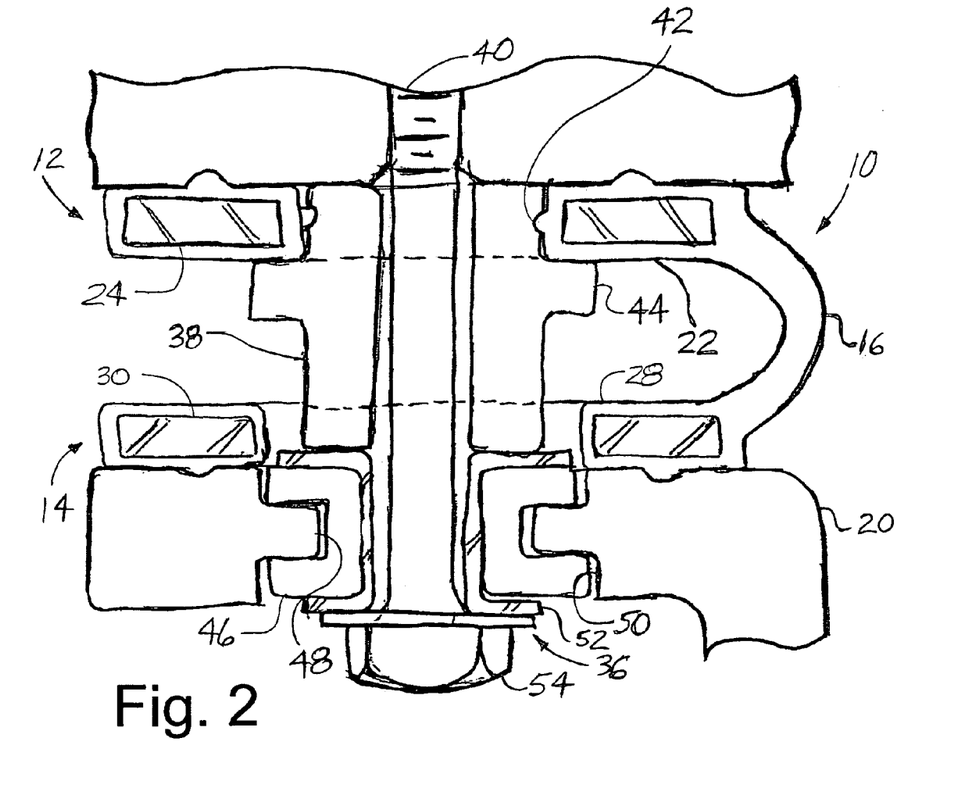
FIG. 2 is a partial sectional view, similar to FIG. 1, but on an enlarged scale and with the section cut taken through a fastener location.

FIGS. 1 and 2 illustrate a first embodiment of the present invention. A gasket 10 is shown that includes a first sealing portion 12, a second sealing portion 14, and an elastic arm 16 extending between the first portion 12 and the second portion 14. The first sealing portion 12 is in sealing engagement with a first member 18, while the second sealing portion 14 is in sealing engagement with a second member 20. The first member 18 and second member 20 may be, for example, an engine block and an oil pan, or a rocker/cam cover and an engine block—although, the gasket 10 of the present invention may be used to seal between other types of components where a fluid is sealed in (or out) and a reduction in vibration transmission between two components is desired. In FIGS. 1 and 2, if the first member 18 is an engine block and the second member 20 is an oil pan, then the oil side is preferably to the right as seen in FIGS. 1 and 2, with the atmosphere side to the left.

The first sealing portion 12 includes an elastomeric portion 22, which surrounds a flange 24. The flange 24 is preferably formed of a relatively stiff material, such as plastic or metal, in order to provide reinforcement and increase the strength of the first sealing portion 12. Preferably, the elastomeric portion 22 includes a pair of sealing ribs 26, which increase the effectiveness of sealing the first sealing portion 12 against the first member 18. The ribs 26 can be integrally molded with the elastomeric portion 22. The second sealing portion 14 includes an elastomeric portion 28, which surrounds a flange 30, similar to the first sealing portion. Again, preferably, the elastomeric portion 28 includes a pair of integral sealing ribs 32, which increase the effectiveness of sealing the second sealing portion 14 against the second member 20.

Figure 4:
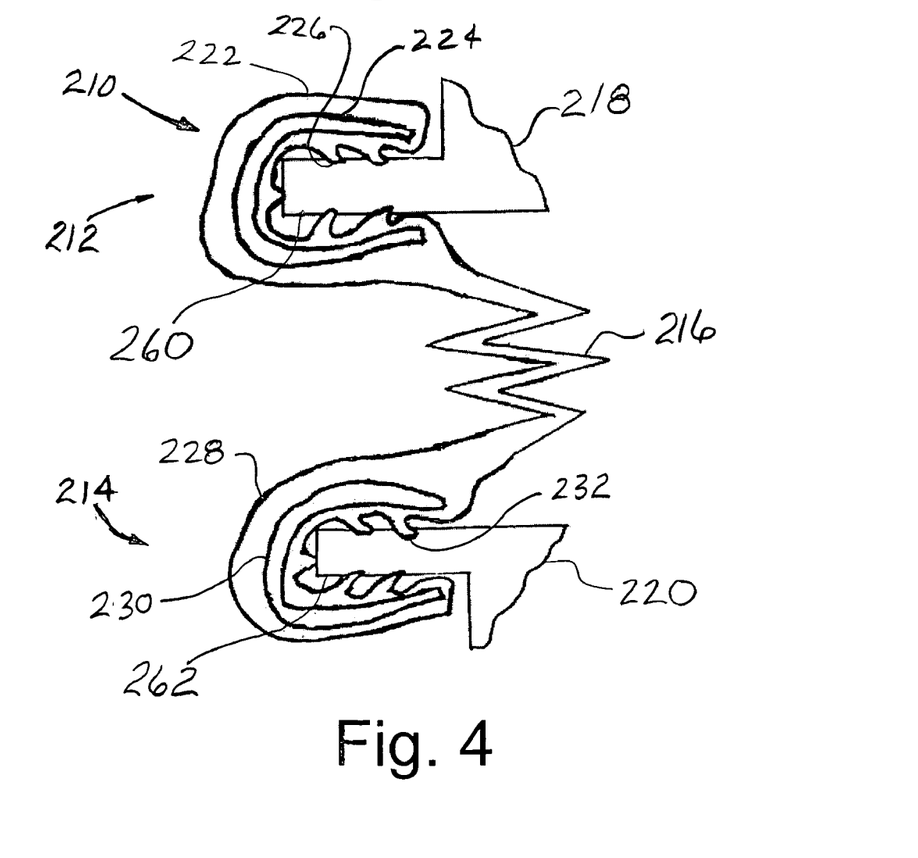
FIG. 4 is a partial, sectional view of a gasket mounted between two members in accordance with a third embodiment of the present invention.

The elastic arm 16 is preferably formed integrally with the first sealing portion 12 and the second sealing portion 14, and made of an elastomeric material such as rubber. The elastic arm 16 is not in a fully compressed state nor in a fully expanded state, so it can relatively easily flex. Since the elastic arm 16 is relatively flexible and not subjected to relatively high compressive forces, with the first sealing portion 12 spaced from the second sealing portion 14, the first portion 12 and the second portion 14 are essentially vibrationally decoupled. And yet, a complete seal between the two members 18, 20 is achieved. The elastic arm 16 may be relatively smooth, acting like a membrane, as is illustrated in the FIGS. 1 and 2, or, alternatively, may be formed as a bellows, as illustrated in FIG. 4, discussed below.

The distance between the members 18, 20 is generally established at the fastener locations. Each fastener assembly 36 acts to limit the compression in the elastic arm 16 by maintaining a spacing between the members 18, 20, and to assure that the vibration isolation between the members 18, 20 is maintained, (one fastener assembly location shown in FIG. 2). While only one fastener assembly 36 is shown, the others can be essentially the same. The number of fastener locations and spacing depends upon the particular members being joined, the pressure difference of the fluids, as well as other typical factors considered for sealing between two members. However, by employing gaskets according to this invention, it is likely that the number of fasteners needed to join two members, such as an engine block and oil pan, can be reduced since the balancing of a relatively high gasket load is significantly reduced.

Each fastener assembly 36 preferably includes a compression limiter 38 surrounding a fastener 40, which abuts and seals against the first sealing portion 12. The first sealing portion 12 may include an additional sealing rib 42 that seals against a surface of the compression limiter 38. The compression limiter 38 may have a flange 44 that abuts the first sealing portion 12. The fastener assembly 36 also includes a grommet 46 that is received on a lip 48 formed within a bolt hole 50 of the second member 20. A grommet support 52 surrounds the grommet 46 and abuts against the compression limiter 38. The grommet 46 is preferably formed of an elastomeric material in order to maintain the vibration isolation between the first and second members 18, 20, while the grommet support 52 is preferably made of a relatively stiffer material in order to support the grommet while providing a spacing between the compression limiter 38 and the bolt head 54. Of course, the arrangement and shape of the compression limiters and grommets at the various fastener locations can be modified to suit the particular members being joined.

In the prior art, the sealing load was established by the two members being compressed together, with a gasket between them. This resulted in any elastomeric portion of the gasket being essentially fully compressed, so it cannot provide any type of vibrational isolation between the members. On the other hand, as discussed above, in the embodiments of the present invention, each sealing portion creates most of its own sealing load against a portion of the particular member against which it is sealing—this allows the elastic arm to be less than fully compressed or fully expanded. Since the gasket 10 is not highly compressed with a compression sealing load between the members 18, 20, there is minimal transfer of vibration between the members 18, 20 via the gasket 10, (vibrationally decoupling the first and second members). Moreover, the fastener assemblies 36 help to maintain the vibration isolation.

Figure 3:
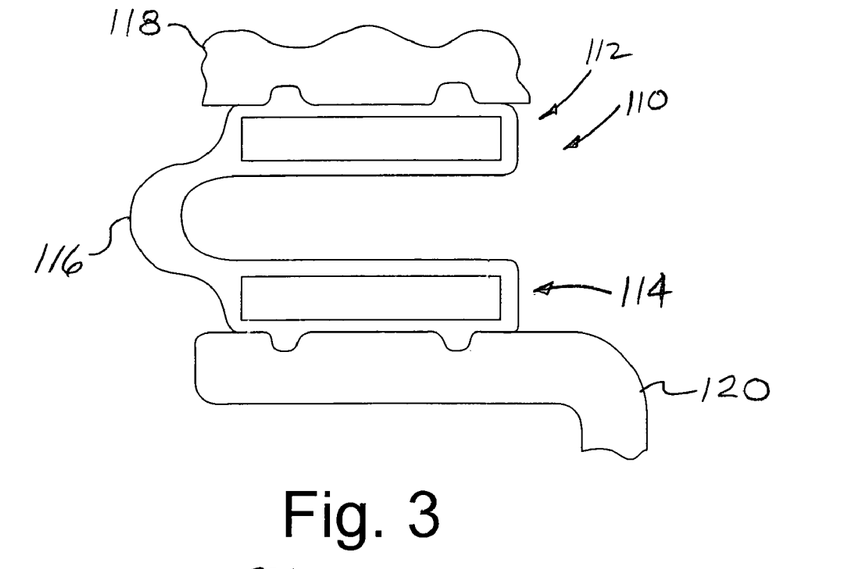
FIG. 3 is a partial, sectional view similar to FIG. 1, but illustrating a second embodiment of the present invention.

FIG. 3 illustrates a second embodiment of a gasket indicated generally at 110 according to this invention. Elements in this embodiment that are similar to elements in the first embodiment will be similarly designated, but with a 100-series number. The gasket 110 again includes a first sealing portion 112, a second sealing portion 114, and an elastic arm 116 that connects the sealing portions 112, 114. In this embodiment, the elastic arm 116 is located on the opposite side of the sealing portions 112, 114, thus illustrating that the concave surface of the elastic arm 116 may face either way relative to the fluid being sealed, if so desired.

FIG. 4 illustrates a third embodiment of a gasket 210 according to this invention. Elements in this embodiment that are similar to elements in the first embodiment will be similarly designated, but with a 200-series number. The gasket 210 includes a first sealing portion 212, a second sealing portion 214, and a flexible bellows 216 connected between them. Alternatively, the bellows 216 can be in the form of a membrane, if so desired. While the other embodiments disclosed herein illustrate a membrane for the elastic arm, a bellows may be employed instead, if so desired.

The first sealing portion 212 has a generally U-shaped cross section that surrounds a flange 260 of the first member 218, with the flange 224 now forming a clip surrounded by the elastomeric portion 222. Preferably, a series of sealing ribs 226 extend from the elastomeric portion 222 toward the member flange 260. The flange 224 is shaped to create an opening between the sealing ribs 226 that is smaller than the thickness of the member flange 260 and is made of a material that will spring back to its original shape. So, when the first sealing portion 212 is assembled to the member flange 260, the flange 224 will create a sealing force on the ribs 226 against the member flange 260. The sealing ribs 226 will cause the sealing force to peak at those locations, thus creating an effective seal along the surface of the member, as is known to those skilled in the art. Moreover, the sealing force will secure the first sealing portion 212 to the member flange 260. Consequently, the first sealing portion 212 seals against and is secured to the first member 218 without requiring any compression force applied by the second member 220.

Likewise, the second sealing portion 214 has a generally U-shaped cross section, with the flange 230 forming a clip surrounded by the elastomeric portion 228, and sealing ribs 232 protruding from the elastomeric portion 228. The sealing ribs 232 are pressed against the member flange 262 with a sealing force sufficient to create a seal between the second sealing portion 214 and the second member 220. The sealing force will secure the second sealing portion 214 to the member flange 262.

The elastic arm 216, in this embodiment shown as a bellows, spans the distance between the first and second sealing portions 212, 214, and seals between them without the need for high compressive loads. Thus, the first and second members 218, 220 are vibrationally decoupled from each other.

Figure 5:
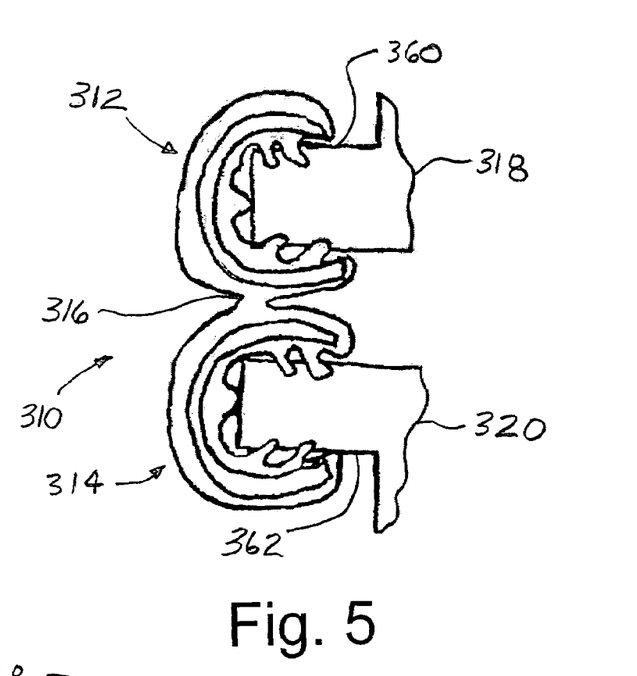
FIG. 5 is a partial, sectional view of a gasket mounted between two members in accordance with a fourth embodiment of the present invention.

FIG. 5 illustrates a fourth embodiment of the present invention. Elements in this embodiment that are similar to elements in the previous embodiments will be similarly designated, but with a 300-series number. The gasket 310 includes a first sealing portion 312 that mounts to a flange 360 of a first member 318, and a second sealing portion 314 that mounts to a flange 362 of a second member 320, in the same way as in the third embodiment. In this embodiment, however, the elastic arm 316 is much shorter. The shorter elastic arm 316 creates a more compact assembly, but likely does not allow for as much vibrational isolation as with the third embodiment.

Figure 6:
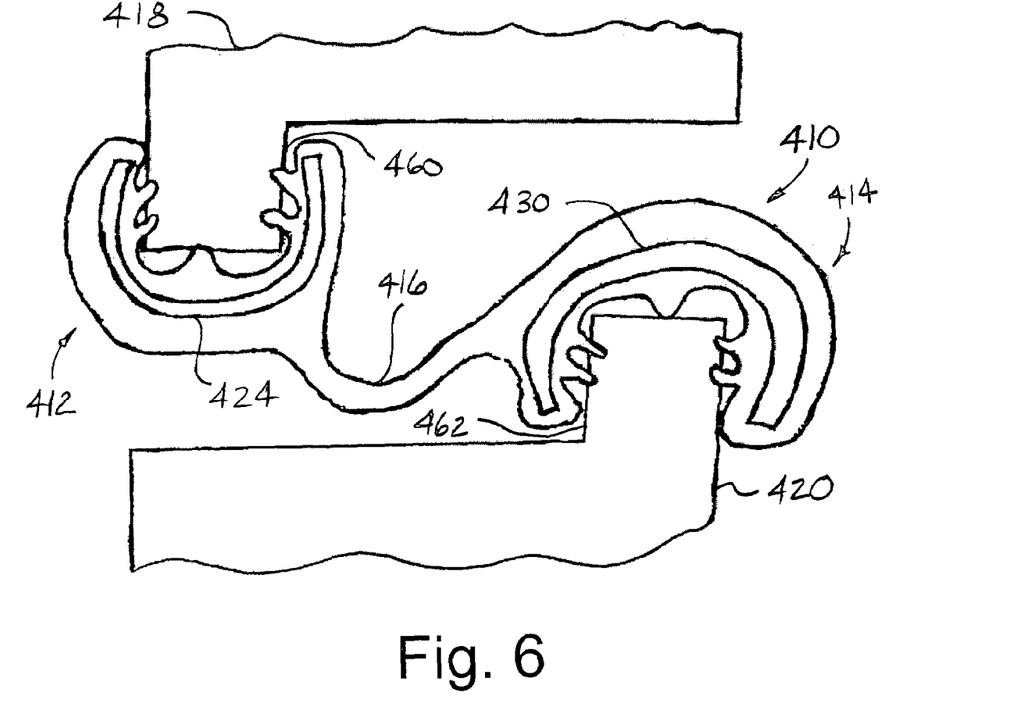
FIG. 6 is a partial, sectional view of a gasket mounted between two members in accordance with a fifth embodiment of the present invention.

FIG. 6 illustrates a fifth preferred embodiment of a gasket 410 according to this invention. Elements in this embodiment that are similar to elements in the previous embodiments will be similarly designated, but with 400-series numbers. The gasket 410 includes a first sealing portion 412, a second sealing portion 414, and an elastic arm 416. The sealing portions 412, 414 again have generally U-shaped cross sections with a curved flange 424, 430, respectively, for creating sealing forces. The sealing portions 412, 414 in this embodiment, however, are oriented to accommodate laterally offset flanges 460, 462, of members 418, 420, respectively, which each extend toward the opposite member. Since the sealing force acting against the first member 418 is created by the first sealing portion 412 and the sealing force acting against the second member 420 is created by the second sealing portion 414, the sealing portions 412, 414 and member flanges 460, 462 can have various orientations while still creating a good seal and vibrationally decoupling the members.

Figure 7:
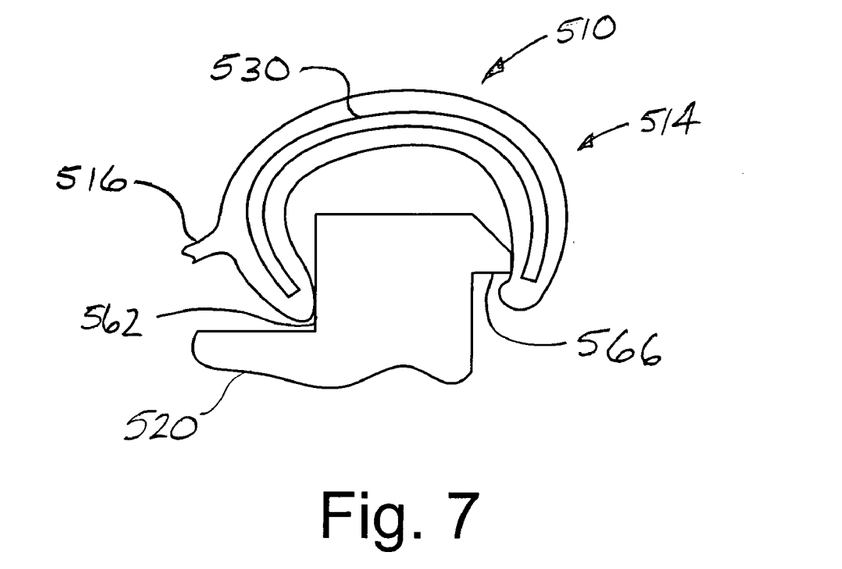
FIG. 7 is a partial, sectional view of a gasket mounted between two members in accordance with a sixth embodiment of the present invention.

FIG. 7 illustrates a sixth preferred embodiment of a gasket 510 according to this invention. Elements in this embodiment that are similar to elements in the previous embodiments will be similarly designated, but with 500-series numbers. This embodiment is similar to the embodiment of FIG. 6, but with a different sealing and retaining arrangement for the first and second sealing portions (only the second sealing portion 514 illustrated), but with a similar elastic arm 516. The flange 562 of the second member 520 includes a retaining protrusion 566 extending therefrom. The elastic portion 528 surrounds the flange 530, but preferably does not include sealing ribs. Instead, the elastic portion 528 catches on and abuts against the retaining protrusion 566 to create a seal. The flange 530 still creates the sealing and retaining force for the second sealing portion 514. The retaining protrusion may be cast, molded, or formed in some other preferred way on the flange 562.

Figure 8:
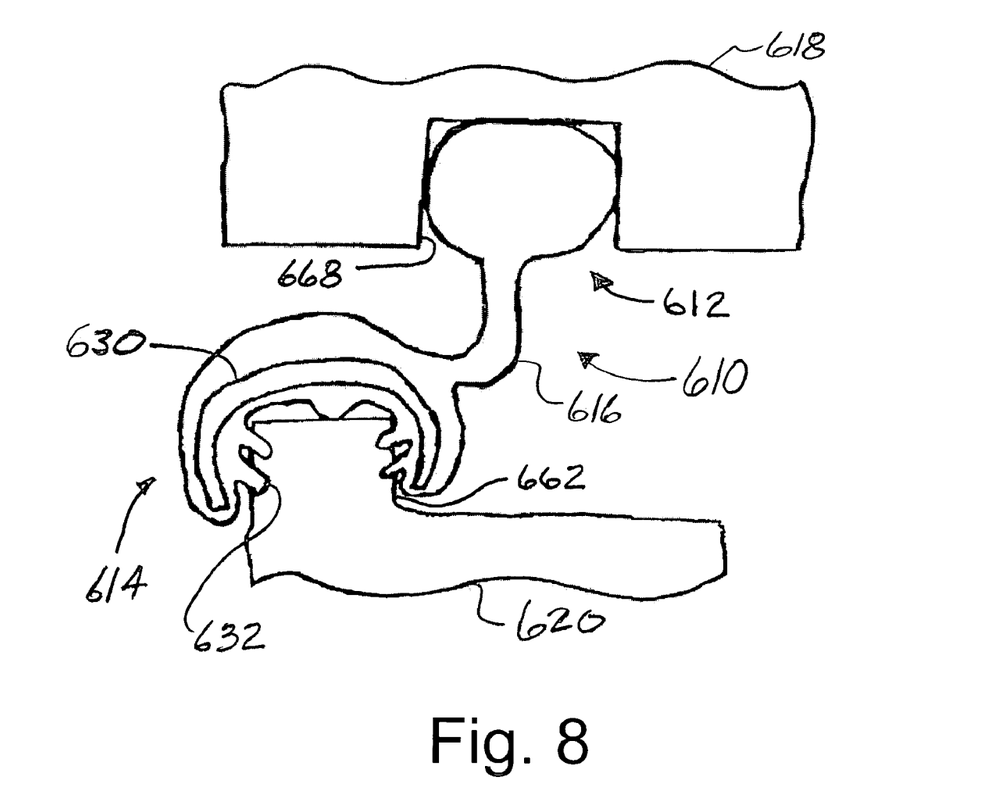
FIG. 8 is a partial, sectional view of a gasket mounted between two members in accordance with a seventh embodiment of the present invention.

FIG. 8 illustrates a seventh preferred embodiment of a gasket 610 according to this invention. Elements in this embodiment that are similar to elements in the previous embodiments will be similarly designated, but with 600-series numbers. A second sealing portion 614 is similar to the second sealing portion in the fifth embodiment of the present invention, with a generally U-shaped flange 630 creating a sealing and retaining force for sealing ribs 632 abutting a flange 662 of a second member 620. The first sealing portion 612 is now shaped similar to an O-ring and fits into a recess 668, with an interference fit between the two in order to create a sealing and retaining force between them. Again, the first seal portion 612 forms a seal against the first member 618 without requiring any compressive force contributed by the second member 620. An elastic arm 616 extends between and is preferably formed integral with the first and second sealing portions 612, 614. As with the previous embodiments, the gasket 610 provides a good seal while vibrationally decoupling the members 618, 620.

Figure 9:
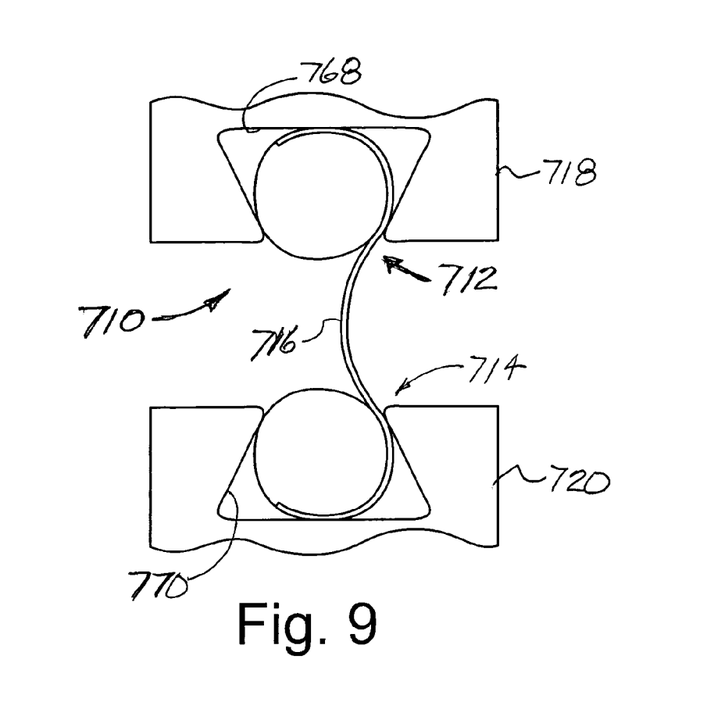
FIG. 9 is a partial, sectional view of a gasket mounted between two members in accordance with an eighth embodiment of the present invention.

FIG. 9 illustrates an eighth preferred embodiment of a gasket 710 according to this invention. Elements in this embodiment that are similar to elements in the previous embodiments will be similarly designated, but with 700 series numbers. The gasket 710 includes a first sealing portion 712 that is similar in shape to an O-ring, a second sealing portion 714 that is also similar in shape to an O-ring, and an elastic arm 716 extending between them. The elastic arm 716 can be integrally formed with the first and second sealing portions 712, 714, or alternatively, it can be formed separately and then attached in a subsequent operation, such as a bonding operation. Each sealing portion 712, 714 fits into a corresponding recess 768, 770 in a first and second member 718, 720, respectively. Each sealing portion 712, 714 is press fit into its corresponding recess 768, 770 in order to create the sealing and retention forces. Again, the compression forces are not created by compressing the first and second members 718, 720 together, allowing for vibrational decoupling between the two.

Figure 10:
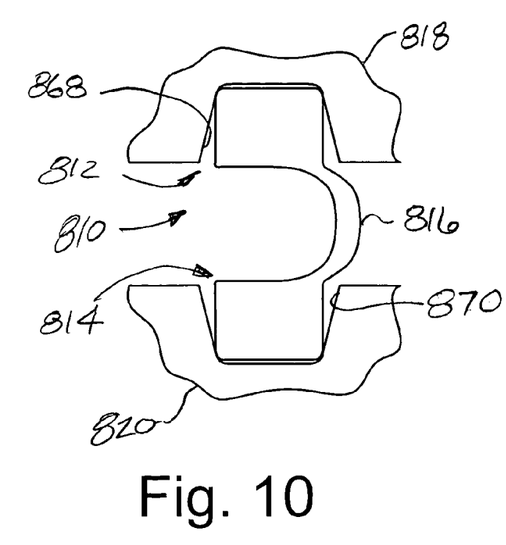
FIG. 10 is a partial, sectional view of a gasket mounted between two members in accordance with a ninth embodiment of the present invention.

FIG. 10 illustrates a ninth preferred embodiment of a gasket 810 according to this invention. Elements in this embodiment that are similar to elements in the previous embodiments will be similarly designated, but with 800-series numbers. This embodiment is similar to the eight embodiment, except that the first and second sealing portions 812, 814 are rectangular shaped in cross section. Each sealing portion 812, 814 fits into a corresponding recess 868, 870, in a first and second member 818, 820, respectively. An elastic arm 816 extends between the two sealing portions 812, 814. The elastic arm 816 will be slightly compressed during assembly in order to provide a sealing force for the first and second sealing portions 812, 814, but is much less than fully compressed in order to maintain vibration isolation between the members 818, 820.

Figure 11:
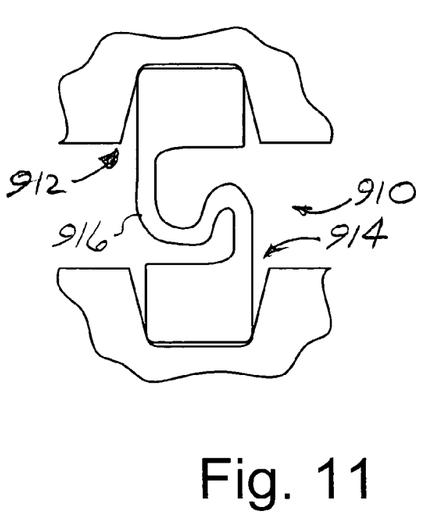
FIG. 11 is a partial, sectional view of a gasket mounted between two members in accordance with a tenth embodiment of the present invention.

FIG. 11 illustrates a tenth preferred embodiment of a gasket 910 according to this invention. Elements in this embodiment that are similar to elements in the previous embodiments will be similarly designated, but with 900-series numbers. The first and second sealing portions 912, 914 are essentially the same as in the ninth embodiment, but the elastic arm 916 is longer.

Figure 12:
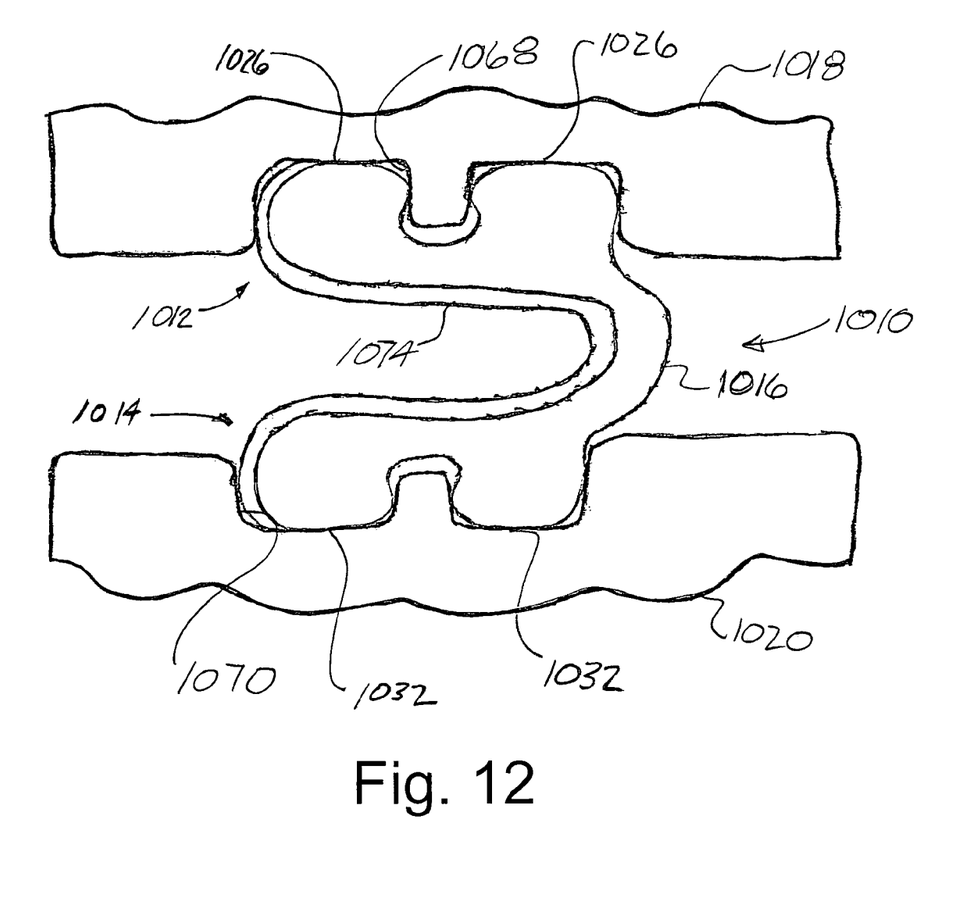
FIG. 12 is a partial, sectional view of a gasket mounted between two members in accordance with an eleventh embodiment of the present invention.

FIG. 12 illustrates an eleventh preferred embodiment of a gasket 1010 according to this invention. Elements in this embodiment that are similar to elements in the previous embodiments will be similarly designated, but with 1000-series numbers. A first sealing portion 1012 has a pair of sealing extensions 1026 that fit into a corresponding pair of recesses 1068 in the first member 1018. A second sealing portion 1014 has a pair of sealing extensions 1032 that fit into a corresponding pair of recesses 1070, with a membrane extending between the first and second sealing portions 1012, 1014. This gasket 1010 also includes a permeation membrane 1074 secured to one surface of the gasket 1010. Although not shown in the other embodiments, a permeation membrane can also be employed with those embodiments, if so desired. Each sealing portion 1012, 1014 can, as an alternative, include a stiffening flange, if so desired. Moreover, as an alternative, the permeation membrane 1074 can be located on the opposite surface of the gasket 1010—depending upon which side of the seal is sealing against an aggressive fluid.

While certain embodiments of the present invention have been described in detail, those familiar with the art to which this invention relates will recognize various alternative designs and embodiments for practicing the invention as defined by the following claims.

What is claimed is:

1. A gasket adapted for sealing between a first member and a second member, the gasket comprising:
   a first sealing portion including a first elastomeric portion generally surrounding a first flange portion, said first elastomeric portion being adapted to be in sealing engagement with the first member;
   a second sealing portion including a second elastomeric portion generally surrounding a second flange portion, said second elastomeric portion being adapted to be in sealing engagement with the second member, and spaced from the first sealing portion, said first and second flange portions and said first and second elastomeric portions of said first and second sealing portions including a plurality of axially aligned pairs of apertures each adapted to receive a single fastening device extending between the first and second members and through each of said pairs of apertures, one of said first and second members being fixed relative to said fastening device, and the other of said first and second members being slidably moveable relative to said fastening device to accommodate vibrational relative movement between said first and second members; and
   an elastic arm sealingly connecting the first sealing portion to the second sealing portion, with the elastic arm being in a less than fully compressed state and a less than fully expanded state between the first sealing portion and the second sealing portion, whereby the gasket is adapted to allow the first member to be generally vibrationally decoupled from the second member.

2. The gasket according to claim 1 wherein the first sealing portion includes sealing ribs.

3. The gasket according to claim 1 wherein the elastic arm is shaped in the form of a membrane.

4. The gasket according to claim 1 wherein the elastic arm is shaped in the form of a bellows.

5. A gasket adapted for sealing between a first member and a second member, the gasket comprising:
   a first sealing portion adapted to be in sealing engagement with the first member,
   a second sealing portion adapted to be in sealing engagement with the second member, and spaced from the first sealing portion, said first and second sealing portions including a plurality of axially aligned apertures each adapted to receive a fastening device extending between the first and second members; and
   an elastic arm sealingly connecting the first sealing portion to the second sealing portion, with the elastic arm being in a less than fully compressed state and a less than fully expanded state between the first sealing portion and the second sealing portion, whereby the gasket is adapted to allow the first member to be generally vibrationally decoupled from tile second member; and
   a fastener assembly extending through at least one of said plurality of axially aligned apertures, with the fastener assembly having a compression limiter, an elastomeric grommet, and a fastener extending through the compression limiter and the grommet, and with the grommet adapted to engage the second member and the compression limiter adapted to extend generally between the grommet and the first member.

6. A seal assembly comprising:
   a first member;
   a second member;
   a first sealing portion including a first flange having a generally U-shaped cross-section and a first elastomeric portion generally surrounding the first flange with the first elastomeric portion having sealing ribs extending therefrom and with the sealing ribs in sealing engagement with a member flange extending from the first member;
   a second sealing portion formed of an elastomeric material and in sealing engagement with the second member, and spaced from the first sealing portion;
   an elastic arm sealingly connecting the first sealing portion to the second sealing portion, with the elastic arm being in a less than fully compressed state and a less than fully expanded state between the first sealing portion and the second sealing portion, whereby the gasket allows the first member to be generally vibrationally decoupled from the second member; and
   wherein the first member is an engine block and the second member is an oil pan.

7. A seal assembly comprising:
   a first member;
   a second member;
   a first sealing portion including a first flange having a generally U-shaped cross-section and a first elastomeric portion generally surrounding the first flange, with the first elastomeric portion having sealing ribs extending therefrom, and with the sealing ribs in sealing engagement with a member flange extending from the first member;
   a second sealing portion formed of an elastomeric material and in sealing engagement with the second member, and spaced from the first sealing portion;
   an elastic arm sealingly connecting the first sealing portion to the second sealing portion, with the elastic arm being in a less than fully compressed state and a less than fully expanded state between the first sealing portion end the second sealing portion, whereby the gasket allows the first member to be generally vibrationally decoupled from the second member; and
   wherein the first member is an engine cylinder head and the second member is a rocker/cam cover.

8. A seal assembly comprising:
   a first member;
   a second member;
   a first sealing portion including a first flange having a centrally U-shaped cross-section and a first elastomeric portion generally surrounding the first flange, with the first elastomeric portion having sealing ribs extending therefrom, and with the sealing ribs in sealing engagement with a member flange extending from the first member;

a second sealing portion formed of an elastomeric material and in sealing engagement with the second member, and spaced from the first sealing portion;

an elastic arm sealing connecting the first sealing portion to the second sealing portion, with the elastic arm being in a less than fully compressed state and a less than fully expanded state between the first sealing portion another second sealing portion, whereby the gasket allows the first member to be generally vibrationally decoupled from the second member; and wherein said second sealing portion includes a second flange having a generally U-shaped cross-section and a second elastomeric portion generally surrounding the second flange, with the second elastomeric portion having sealing ribs extending therefrom, and with the sealing ribs in sealing engagement with a member flange extending from the second member.

* * * * *